Patented Apr. 18, 1950

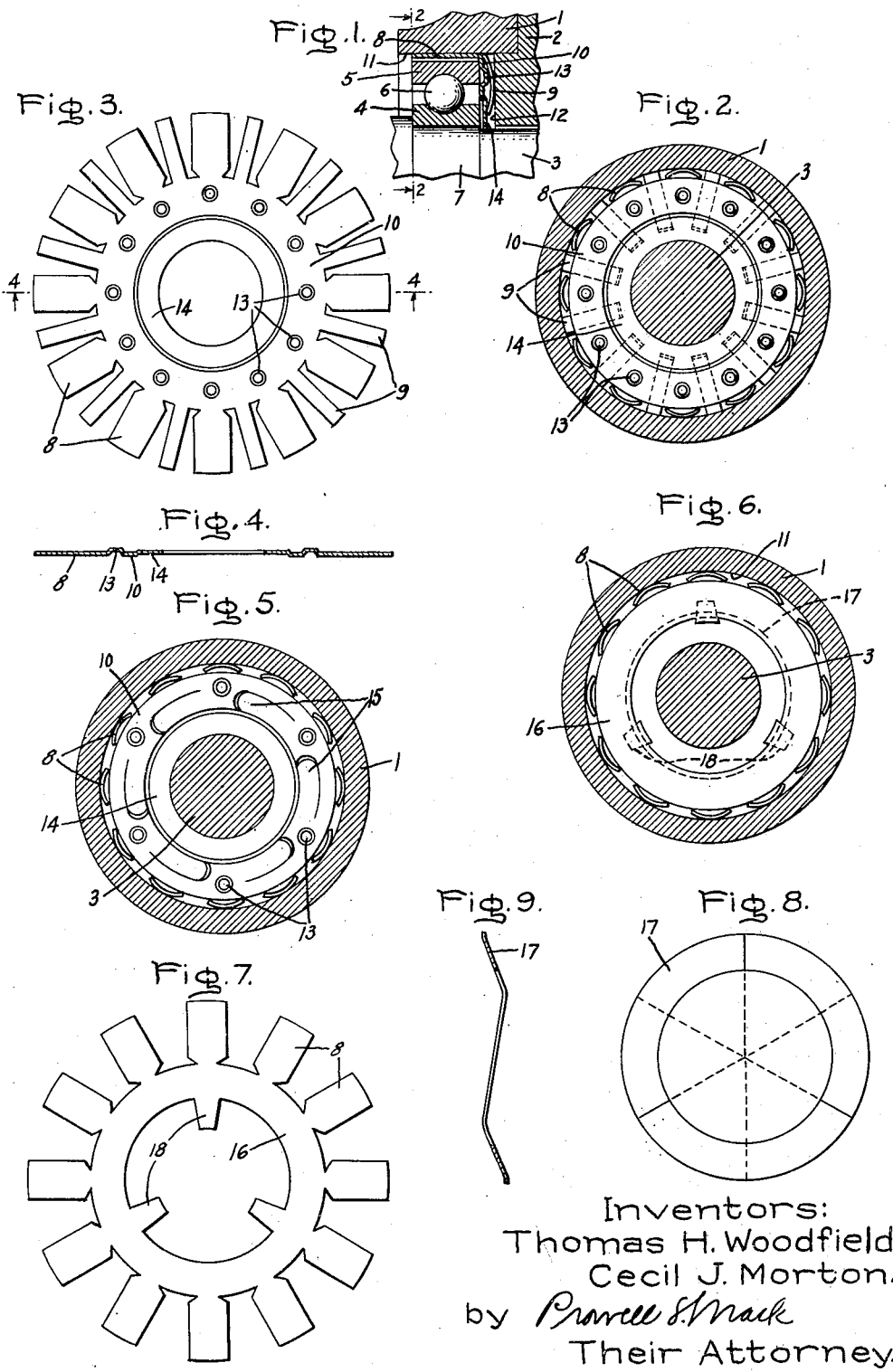

2,504,776

UNITED STATES PATENT OFFICE 2,504,776

SUPPORTING STRUCTURE

Thomas Henry Woodfield, Birmingham, and Cecil James Morton, Coventry, England, assignors to General Electric Company, a corporation of New York Application November 29, 1945, Serial No. 631,712
In Great Britain January 15, 1945

5 Claims. (Cl. 308—184)

1

Our invention relates to a supporting structure adapted to support rotatable elements, such as shafts, and includes an arrangement for mounting antifriction bearings with provision for insuring the correct fit of the outer race of the bearing within its bearing housing.

In modern practice, antifriction bearings such as ball bearings are generally fitted to a shaft which is supported thereby, as for example the shaft of an electric motor, by arranging the inner race with a press fit on each end of the shaft and clamping the outer race at one end in its housing and allowing the outer race at the other end of the machine a limited amount of freedom to move in an axial direction to adapt itself, such that both bearings run freely without end thrust or interference with the free movement of the balls in the bearings. To provide this freedom of movement of the unclamped outer race, it is necessary that the fit of this outer race in its housing be such that the race is free to move axially and yet not free enough to allow creepage in a circumferential direction. This requires very close tolerances in the diameters of both the outer race and the bearing housing and often necessitates selective assembly.

An object of our invention is to provide an improved supporting structure for a shaft or other rotatable member.

Another object of our invention is to provide an improved antifriction bearing construction.

A further object of our invention is to provide an improved antifriction bearing supporting structure in which radial and axial pressure is exerted on the outer race of an antifriction bearing to allow a limited amount of axial movement to the bearing and to prevent its rotation within the bearing housing with a minimum of noise and vibration of the bearing.

Further objects and advantages of our invention will become apparent and our invention will be better understood from the following description referring to the accompanying drawing and the features of novelty which characterize our invention will be pointed out with particularity in the claims annexed to and forming part of this specification.

In one embodiment of our invention, a resilient cap is fitted over the outer race of an antifriction bearing to provide combined radial and axial pressure thereon. This cap may comprise a washer of steel or other suitable resilient material having radially extending fingers or projections around its periphery which are curved in the circumferential direction and formed on an

2 annular flange or other portion thereof at right angles to the washer to fit over the periphery of the outer bearing race and thereby provide a resilient packing between the outer bearing race and the housing in which it is fitted.

Another feature of our invention consists in providing a comparatively light axial pressure on the outer bearing race sufficient to take up any slackness of the fit of the balls between the inner and outer races and thus reduce bearing noise and vibration to a minimum. This feature can be incorporated as an integral part of the washer or it can be attained by a separate element which may be readily assembled over the outer bearing race to provide a self-contained unit with the antifriction bearings.

In the drawing, Fig. 1 is a sectional view showing a part of a bearing housing and shaft arranged therein supported by an antifriction bearing of the ball bearing type provided with an embodiment of my invention; Fig. 2 is a sectional view taken along line 2—2 of Fig. 1, in which the bearing is omitted; Fig. 3 is an elevational view of a punching from which a resilient cap may be formed; Fig. 4 is a sectional view taken along line 4—4 of Fig. 3; Fig. 5 is a sectional view similar to Fig. 2 illustrating another embodiment of my invention; Fig. 6 is a sectional view also similar to Fig. 2 showing a further embodiment of our invention; Fig. 7 is an elevational view of a blank from which a cap or washer such as that shown in Fig. 6 may be formed; Fig. 8 is an elevational view of a loading washer which may be used in conjunction with the cap shown in Fig. 6; and Fig. 9 is a sectional view showing the wave-shape contour of Fig. 8, taken along a diameter of this washer.

Referring to the drawing we have shown in Figs. 1, 2, 3, and 4 an embodiment of our invention in which the supporting structure includes a bearing housing formed of two parts 1 and 2 in which an antifriction bearing is arranged for supporting a rotatable shaft member 3. The antifriction bearing shown includes an inner race 4 and an outer race 5 with a plurality of antifriction ball bearing elements 6 therebetween arranged within an opening formed between the bearing housing members 1 and 2. As in the conventional construction, the inner bearing race 4 may be press-fitted on a shoulder 7 of the shaft 3 and a resilient cap member is interposed between the bearing housing and the outer race 5 of the bearing. This cap may be formed of any suitable material such as of a resilient steel sheet and may originally be punched or otherwise formed as a blank, as shown in Fig. 3, with a plurality of relatively wide spring finger elements 8 with intermediate relatively narrower spring finger elements 9 extending outwardly from a central ring portion 10. The wider spring finger elements 8 are curved peripherally, as shown in Fig. 2, and are bent at substantially right angles to the central ring portion 10. As shown in Fig. 1, the resilient cap member is arranged with the spring fingers 8 extending axially over the outer bearing race 5 in engagement with the inner surface 11 of the bearing housing member 1 and in engagement with the outer surface of the outer bearing race 5 to provide a radial pressure on the outer bearing race. In order to accommodate this assembly in the bearing housing, the opening in the housing member is formed with a larger diameter than the outer diameter of the outer bearing race. The axial space of this opening is slightly larger than the axial length of the bearing races, such that when the resilient cap portion 10 is arranged in engagement with the adjacent end wall of the outer bearing race 5 and the resilient spring fingers 9 are bent back over this ring portion 10 of the cap, these spring fingers 9 are arranged in engagement with the axial end wall 12 of the opening in the bearing housing to provide an axial pressure on the outer bearing race and permit a limited amount of end play which can be cushioned by these spring fingers 9. In order to prevent excessive compression of the spring fingers 9, a plurality of indentations 13 are formed in the ring portion 10 and extend between the spring fingers 9 toward the end wall 12 of the housing, thereby preventing complete flattening out of the spring fingers 9 by endwise pressure thereon. In addition, it is desirable that the resilient cap should not engage the rotatable inner race 4 of the bearing and therefore the ring portion 10 of the resilient cap is formed with an outwardly extending stepped portion 14 which extends away from the inner bearing race 4 and which may be used as a guard for the ends of the spring fingers 9 to prevent engagement of these spring fingers with the inner race 4. With this construction it is not necessary that the bearing or the housing be formed to close tolerances, as slight variations in the dimensions of the bearing and the housing bearing opening will be taken up by flexing of the spring fingers 8 and 9 of the resilient cap member.

In Fig. 5 we have shown another embodiment of our invention in which the resilient bearing cap member is formed with a plurality of spring fingers 8 which extend at substantially right angles to the ring portion 10 formed in the same manner and arranged about a bearing in a bearing housing as in the construction shown in Figs. 1 to 4 inclusive. In this construction however the axial pressure is provided by a plurality of flexible spring finger elements 15 which are punched from the central ring portion 10 and extend axially towards an end wall of the bearing housing opening for engagement with this wall to provide the desired axial pressure on the outer bearing race. These spring fingers 15 function in the same manner as the spring fingers 8 in the construction shown in Fig. 1. The remainder of this construction is essentially the same as that shown in Figs. 1 and 2 and corresponding parts in these two embodiments are designated by the same reference numerals.

In Figs. 6, 7, 8, and 9, we have shown a further embodiment of our invention in which the spring washer or cap is formed with a central ring portion 16 which may be punched from any suitable resilient material, such as steel, in the form of a blank, as shown in Fig. 7, with a plurality of outwardly extending spring fingers 8 which are adapted to be curved peripherally, as shown in Fig. 6, and bent at substantially right angles to the ring portion 16 in the same manner as explained with respect to the embodiment of our invention shown in Fig. 1. As in the other constructions, the bearing is adapted to be arranged in a bearing housing opening formed in a housing 1, with the spring fingers 8 arranged in engagement with the inner peripheral surface 11 of the housing opening and in engagement with the outer surface of the outer race of an antifriction bearing in the same manner as shown in Fig. 1 to provide the desired radial pressure on the outer bearing race. In order to provide the desired axial pressure on this bearing race, a loading washer 17 is provided which is formed of wave shape, as shown in Figs. 8 and 9, and is adapted to extend between the outer side of the ring portion 16 of the spring cap and the adjacent end wall of the opening in the bearing housing 1. This loading washer 17 is held in position by a plurality of fingers or tabs 18 which are formed on the inner periphery of the ring portion 16 of the resilient spring cap. These tabs 18 are bent as shown in Fig. 6 to form supporting tabs or lugs which hold the loading washer 17 in position and yet permit the desired compression of this washer to accommodate the bearing in the bearing housing opening and to exert a light axial pressure on the outer race of the antifriction bearing so as to minimize noise and vibration in the bearing and to provide the desired end play cushioning effect thereto.

While we have illustrated and described particular embodiments of our invention, modifications thereof will occur to those skilled in the art. We desire it to be understood therefore that our invention is not to be limited to the particular arrangements disclosed and we intend in the appended claims to cover all modifications which do not depart from the spirit and scope of our invention.

What we claim as new and desire to secure by Letters Patent of the United States, is:

1. A supporting structure including a bearing having an inner race and an outer race with antifriction bearing elements therebetween, a bearing housing arranged around said bearing, and a resilient cap member fitted in said housing over said outer race; said cap member having an annular ring portion engaging an end wall of said outer race, a plurality of resilient spring fingers extending axially from the outer periphery of said ring portion over said outer race and arranged in engagement with a circumferential surface of said housing and the outer surface of said outer race for providing radial pressure on said outer race, and a plurality of other resilient spring fingers on the outer periphery of said ring portion intermediate said first-mentioned spring fingers and arranged in engagement with an axial end wall of said housing for providing axial pressure on said outer race.

2. A supporting structure including a bearing having an inner race and an outer race with antifriction bearing elements therebetween, a bearing housing arranged around said bearing, and a resilient cap member fitted in said housing over said outer race; said cap member having an annular ring portion engaging an end wall of said outer race, a plurality of resilient spring fingers extending axially from the outer periphery of said ring portion over said outer race, said resilient spring fingers being curved peripherally with their center portions arranged in engagement with a circumferential surface of said housing and their edges arranged in engagement with the outer surface of said outer race for providing radial pressure on said outer race, and a plurality of other resilient spring fingers on the outer periphery of said ring portion intermediate said first-mentioned spring fingers and arranged in engagement with an axial end wall of said housing for providing axial pressure on said outer race.

3. A supporting structure including a bearing having an inner race and an outer race with antifriction bearing elements therebetween, a bearing housing arranged around said bearing, and a resilient cap member fitted in said housing over said outer race; said cap member having an annular ring portion engaging an end wall of said outer race, a plurality of resilient spring fingers extending axially from the outer periphery of said ring portion over said outer race and arranged in engagement with a circumferential surface of said housing and the outer surface of said outer race for providing radial pressure on said outer race, and a plurality of other resilient spring fingers on the outer periphery of said ring portion intermediate said first-mentioned spring fingers and arranged in engagement with an axial end wall of said housing for providing axial pressure on said outer race; said ring portion having a plurality of projections formed thereon extending between said other spring fingers toward said housing axial end wall for preventing flattening of said other spring fingers by excessive axial pressure thereon.

4. A supporting structure including a bearing having an inner race and an outer race with antifriction bearing elements therebetween, a bearing housing arranged around said bearing, and a resilient cap member fitted in said housing over said outer race; said cap member having an annular ring portion engaging an end wall of said outer race, a plurality of resilient spring fingers extending axially from the outer periphery of said ring portion over said outer race and arranged in engagement with a circumferential surface of said housing and the outer surface of said outer race for providing radial pressure on said outer race, and a plurality of other resilient spring fingers on the outer periphery of said ring portion intermediate said first-mentioned spring fingers and arranged in engagement with an axial end wall of said housing for providing axial pressure on said outer race; said ring portion having a plurality of projections formed thereon extending between said other spring fingers toward said housing axial end wall for preventing flattening of said other spring fingers by excessive axial pressure thereon, said ring portion having an inwardly extending portion spaced from said inner race for preventing engagement of the ends of said other spring fingers with said inner race.

5. A supporting structure including a bearing having an inner race and an outer race with antifriction bearing elements therebetween, a bearing housing having an opening therein larger in diameter than the outer diameter of said outer race and arranged around said bearing, and a resilient cap member fitted in said housing over said outer race; said cap member having an annular ring portion engaging an end wall of said outer race on the side adjacent an axial end wall of said housing, a plurality of resilient spring fingers on the outer periphery of said ring portion, said spring fingers being bent at right angles to said ring portion to extend over said outer race, said spring fingers being curved peripherally with their center portions arranged in engagement with a circumferential surface of said housing and their edges arranged in engagement with the outer surface of said outer race for providing radial pressure on said outer race, and a plurality of other resilient spring fingers on the outer periphery of said ring portion intermediate said first-mentioned spring fingers, said other spring fingers being bent back over said ring portion and arranged in engagement with said axial end wall of said housing; said ring portion having a plurality of projections formed thereon extending between said other spring fingers toward said axial end wall for preventing flattening of said other spring fingers by excessive axial pressure thereon, said ring portion having an inwardly extending portion spaced from said inner race for preventing engagement of the ends of said other spring fingers with said inner race.

THOMAS HENRY WOODFIELD.
CECIL JAMES MORTON.

REFERENCES CITED

The following references are of record in the file of this patent:

UNITED STATES PATENTS

| Number | Name | Date |
|---|---|---|
| 1,423,950 | Leon | July 25, 1922 |
| 1,961,323 | Almen | June 5, 1934 |
| 1,978,527 | Erickson | Oct. 30, 1934 |
| 2,012,997 | Junkers | Sept. 3, 1935 |
| 2,062,290 | Bott | Dec. 1, 1936 |

FOREIGN PATENTS

| Number | Country | Date |
|---|---|---|
| 407,166 | France | Feb. 21, 1910 |
| 315,352 | Great Britain | May 28, 1929 |